United States Patent [19]

Chen et al.

[11] Patent Number: 5,581,567
[45] Date of Patent: Dec. 3, 1996

[54] DUAL LEVEL ERROR DETECTION AND CORRECTION EMPLOYING DATA SUBSETS FROM PREVIOUSLY CORRECTED DATA

[75] Inventors: Chin-Long Chen, Wappingers Falls, N.Y.; John A. Fifield, Underhill, Vt.; Howard L. Kalter, Colchester, Vt.; Willem B. van der Hoeven, Underhill, Vt.

[73] Assignee: International Business Machines Corporation, Armonk, N.Y.

[21] Appl. No.: 401,297

[22] Filed: Mar. 9, 1995

Related U.S. Application Data

[63] Continuation of Ser. No. 745,626, Aug. 14, 1991, abandoned.

[51] Int. Cl.$^6$ ............................................. G11C 29/00
[52] U.S. Cl. .................. 371/40.1; 371/49.1; 371/40.2
[58] Field of Search ............................ 371/49.1, 49.2, 371/49.4, 40.1, 40.2

[56] References Cited

U.S. PATENT DOCUMENTS

| | | | |
|---|---|---|---|
| Re. 32,708 | 7/1988 | Itoh | 365/189 |
| 3,387,286 | 6/1968 | Dennard | 340/173 |
| 3,568,153 | 3/1971 | Kurtz | 340/146.1 |
| 3,573,728 | 4/1971 | Kolankowsky et al. | 340/146.1 |
| 4,204,634 | 5/1980 | Barshun et al. | 371/40.1 |
| 4,345,328 | 8/1982 | White | 371/37.7 |
| 4,404,673 | 9/1983 | Yamanouchi | 371/13 |
| 4,570,084 | 2/1986 | Griffin et al. | 307/452 |
| 4,780,809 | 10/1988 | Woffinden et al. | 395/575 |
| 4,801,988 | 1/1989 | Kenney | 357/23.6 |
| 4,896,323 | 1/1990 | Korner et al. | 371/61 |
| 5,058,115 | 10/1991 | Blake et al. | 371/40.1 |
| 5,228,046 | 7/1993 | Blake et al. | 371/38.1 |

OTHER PUBLICATIONS

Kalter et al, "A 50-ns 16-Mb DRAM w/ a 10-NS Data Rate & On-Chip ECC", pp. 1118-1128, IEEE Journal of Solid State Circuits, vol. 25, No. 5 Oct. 1990.

"Cost Analysis of On Chip Error Control Coding for Fault Tolerant Dynamic RAMs," Jarwala et al., IEEE 1987, pp. 278-283.

Primary Examiner—Robert W. Beausoliel, Jr.
Assistant Examiner—Phillip F. Vales
Attorney, Agent, or Firm—Sughrue Mion Zinn MacPeak and Seas; Mark F. Chadurjian

[57] ABSTRACT

A memory system that provides extra data bits without utilizing storage capacity. A first data word is fetched from memory and corrected to remove any single-bit errors. A second data word (which is a subset of the first data word as corrected) is then fetched, and new data correction bits (parity or ECC check bits) is generated for the second data word. Both the second data word and the newly-generated data correction bits are output. This structure amortizes the expense of in-system data correction over a greater data output, and over a smaller storage capacity relative to the data output.

27 Claims, 17 Drawing Sheets ical Field

DUAL LEVEL ERROR DETECTION AND CORRECTION EMPLOYING DATA SUBSETS FROM PREVIOUSLY CORRECTED DATA

This is a continuation of application Ser. No. 07/745,626 filed Aug. 14, 1991, now abandoned.

CROSS-REFERENCE TO RELATED APPLICATIONS

Reference is made to co-pending U.S. patent application Ser. No. 479,145, "On-Chip ECC With Optimized Bit And word Redundancy," by J. Barth et al and assigned to the assignee of the present invention, which relates to a memory chip with on-chip error correction code (ECC) circuitry, the teachings of which are incorporated herein by reference.

Reference is also made to co-pending U.S. patent application Ser. No. 479,145, "Optimized On-Chip ECC System," by J. Fifield and assigned to the assignee of the present invention, which relates to an on-chip ECC system that has been designed to minimize data delays without compromising data integrity, the teachings of which are incorporated herein by reference.

BACKGROUND OF THE INVENTION

1. Technical Field

The present invention relates generally to fault—tolerant memory architectures, and more particularly to a memory system that utilizes on-chip fault recovery to enhance data rates.

2. Background Art

In memory systems, it has been a standard practice to provide some sort of fault recovery technique in order to enhance yield/performance. One of these techniques is redundancy, wherein faulty bit/word lines of cells are replaced with spares. Another of these techniques is ECC, wherein a data word is fetched from memory and corrected using generated syndrome bits that identify faulty bits within the data word. See for example the aforementioned U.S. patent application Ser. No. 479,145 and references cited therein.

Another technique is parity, in which a parity bit is generated for a stored data word and is compared against a stored parity bit corresponding to that word. An example of such a system is shown in U.S. Pat. No. 4,528,666, issued to Cline et al and assigned to Texas Instruments.

Yet other memory systems have sought to combine ECC and parity techniques. Examples of such systems as shown in U.S. Pat. No. 3,568,153 to Kurtz et al and U.S. Pat. No. 3,573,728 to Kolankowsky et al, both of which are assigned to the assignee of the present invention. In both patents, new ECC check bits and parity bits are generated for the data as fetched from the memory. Comparing the stored check bits to those newly generated produces a string of syndrome bits that indicate the location of faulty bits within the data word. The syndromes are also used to correct the generated parity as a function of these faulty data bits, and the corrected parity is provided along with the corrected data word.

In providing optimal fault coverage by combining different error coding techniques (such as ECC and parity), the designer must do everything possible to reduce the area and performance impact as much as possible. In other words, these coding techniques add cost by increasing chip size (the requisite logic circuitry consumes critical chip real estate that could be devoted to arrays) while decreasing performance (the data must pass through this logic before being output to the processor, adding delay directly to the data path). In order to reduce the cost of these error recovery techniques, the designer must minimize their impact by minimizing circuit complexity and reducing data delays. One way of reducing data delays is to provide more data in a given time. Neither of the above patents meet these goals; for example, both add appreciably to data delays because parity is generated and then data corrected as a function of the generated syndromes.

SUMMARY OF THE INVENTION

It is thus an object of the present invention to provide a fault-tolerant data processing system at minimum cost, without sacrificing fault coverage.

It is another object of the invention to reduce the cost of fault tolerance by enhancing data rates.

The above and other objects of the invention are achieved by taking advantage of the fault recovery system to provide extra data. Specifically, a first data word is read out along with error correction bits, and is corrected by a fault recovery system. Then data from the corrected data word is used to provide a second data word that has fewer bits than the first data word. Then error correction bits are generated for each of the plurality of second data words, and the newly-generated error correction bits are output along with the second data word.

In this manner, the cost of on-chip fault recovery is reduced, because we rely on the correction of the first data word to provide new error correction bits that will not be faulty. Because the new error correction bits are generated as opposed to stored, the memory system provides more data than it is capable of storing. This enhances data rates, because more data is available in a unit of time from a given accessed portion of memory.

In the invention, the second data word comprises eight of the bits of a corrected 128-bit ECC word. In a first embodiment of the invention, a single parity bit is generated for the second data word, and is provided as a ninth output bit. In a second embodiment of the invention, four of the second data words are combined, and new ECC check bits are generated for the combination. As a result, the 32 data bits are supplemented with seven check bits at the output.

BRIEF DESCRIPTION OF THE DRAWING

The foregoing and other structures and teachings of the invention will become more apparent upon a review of the detailed description of the best mode for carrying out the invention as rendered below. In the description to follow, reference will be made to the accompanying drawing, in which.

DESCRIPTION OF THE BEST MODE FOR CARRYING OUT THE INVENTION

1. RAM With On-Chip Error Correction

The invention relates to a memory system (preferably a DRAM or SRAM) that has the capability of correcting data words fetched from storage, and then breaking down the corrected data word into a plurality of smaller data words for which parity or other correction bits can be generated. Thus, one element of the invention is to provide a means for fetching and correcting data words from memory. This section provides a description of the preferred single-chip embodiment of this element of the invention.

Figure 1:
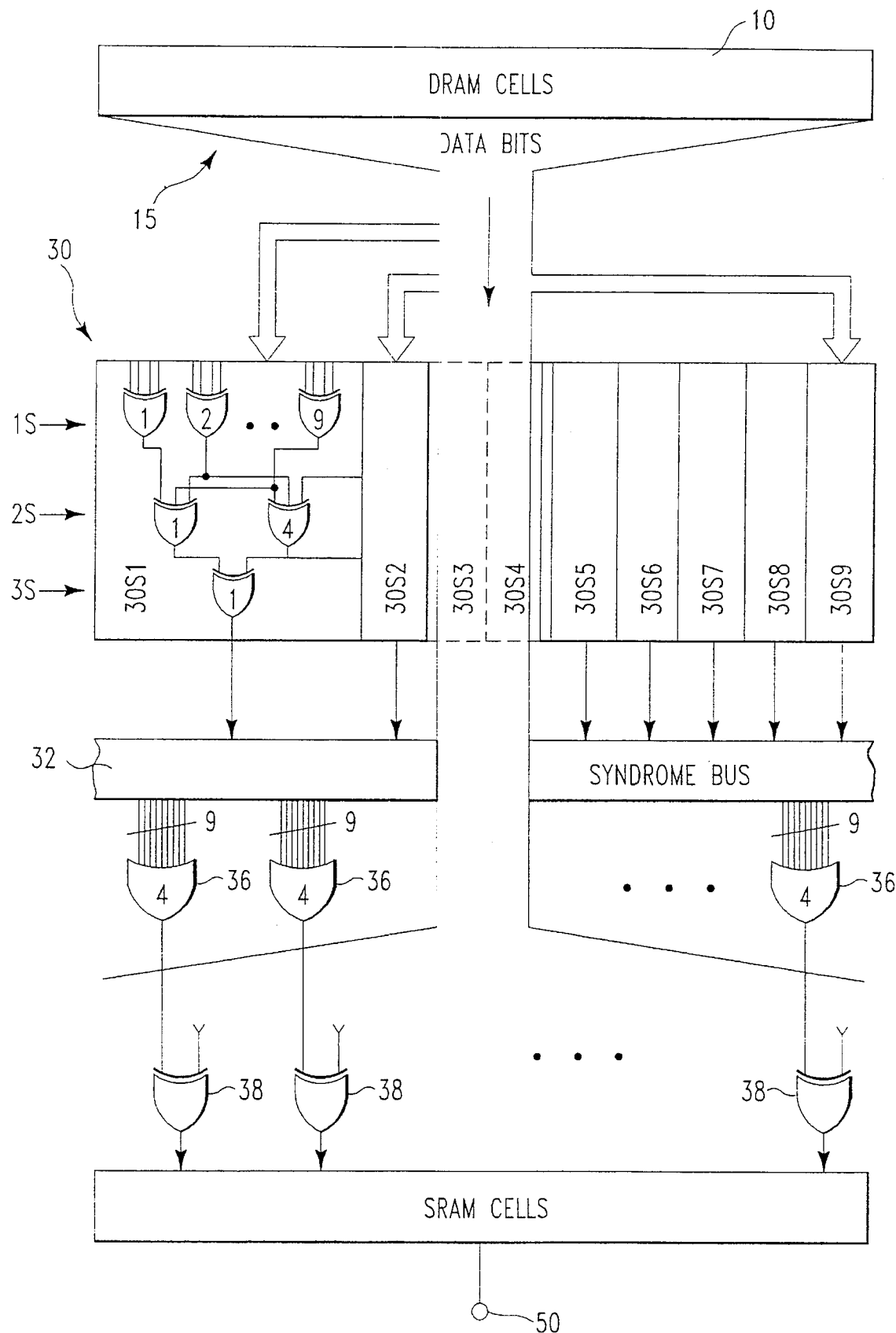
FIG. 1 is a block diagram of a DRAM with the on-chip ECC system utilized in the invention.

With reference to FIG. 1, a general block diagram of a DRAM with on-chip ECC is shown. The DRAM array 10 is coupled to the ECC block 30 by a plurality of pre-data lines (PDLs) 15. Corrected data from the ECC 30 is sent to an SRAM 40, from which it is accessed through I/O 50. While the memory array of the invention could be of any configuration/density, it is preferred that array 10 comprise a 4 Mb quadrant of a 16 million bit (16 Mb) DRAM chip. Thus, such a chip would have four separate ECC systems on-chip, one per quadrant. The memory cells are of the conventional "one device" DRAM type (i.e. an FET having its gate coupled to a word line, its drain coupled to a bit line, and its source coupled to the storage capacitor, wherein a sense amplifier coupled to the bit line compares the voltage from the capacitor to a reference voltage from a reference cell to determine the stored logic state), as generally described in U.S. Pat. No. 3,387,286 issued June 1968 to Dennard and assigned to IBM. Although the cells can be construed using any one of a number of known techniques, it is preferred that substrate-plate cells be used (wherein the storage plate of the storage capacitor is formed by doped poly disposed in a trench that extends through epitaxial layers to the underlaying substrate that forms the charge plate—see U.S. Pat. No. 4,801,988, issued January 1989 to Kenney and assigned to IBM, the teachings of which are incorporated herein by reference).

The DRAM array consists of 4096 word lines and 1096 bit line pairs. That is, in the memory array of the invention it is preferred to use the folded bit line configuration of U.S. Patent RE 32,708. The DRAM array receives control signals ROW ADDRESS STROBE (RAS) and COLUMN ADDRESS STROBE (CAS) from the memory controller. When RAS falls, memory operations commence, and address signals are buffered and decoded to couple two of the 4096 word lines to the array sense amplifiers coupled to the bit lines (preferably the sense amplifiers comprise NMOS and PMOS cross-coupled devices). Subsequently, when CAS falls the input address signals are decoded to determine which bit lines are to be accessed. However, per the teachings of co-pending application Ser. No. 479,145, only a ⅛ decode is done at the array. That is, of the 1096 bit line pairs in the array 10, 137 will be coupled to the pre-data lines 15. Thus, the array provides an error correction word ECW of 137 bits, of which 9 are check bits and 128 are data bits. The remaining address bits at CAS falling are used to access one or more of the bits at the SRAM 40.

The 137 pre-data lines 15 are driven by the cell data to provide inputs to the ECC 30. By "driven," we mean that the PDLs are precharged high, such that when the bit switches turn on to couple the PDLs to the selected bit lines, some of the PDLs are driven from the high voltage (e.g. 3.3 volts) to a low voltage (ground). While as a practical matter any data bussing configuration could be used, in practice it is preferred that the PDLs be disposed above (and criss-cross over) the bit lines of the DRAM array 10, so as to equalize capacitive coupling there between, co-pending application Ser. No. 479,145.

The ECC block 30 utilizes an odd-weight Hamming code, which provides a double error detect, single error correct (DED/SEC) capability. While other codes (e.g., horizontal-vertical parity) could be used, odd-weight Hamming code is preferred because it provides the best error coverage at the lowest cost (for a more detailed comparison between odd-weight ECC codes and other codes, see the article by N. Jarwala et al entitled "Cost Analysis of On Chip Error Control Coding for Fault Tolerant Dynamic RAMs," *Proceedings of the Seventeenth International Symposium on Fault-Tolerant Computing*, Pittsb. Pa., Jul. 6–8 1987, pp. 278–283).

While the operation of the ECC block will be discussed in detail with reference in FIG. 2, the general operation of the major functional blocks for the ECC will now be described with reference to FIG. 1. The ECC block 30 comprises four main parts: syndrome generators 30S1–30S9, syndrome bus 32, NOR gates 36, and XOR gates 38.

As shown within syndrome generator 30S1, each generator (or "syndrome tree") is made up of three stage exclusive-OR (XOR) logic trees. The first stage 1S of the logic tree is made up of a first set of four-input XOR gates; the second stage 2S is made up of approximately four four-input XOR gates; and the final stage 3S is a single four-input XOR gate. Note that the syndrome generators 30S1-30S9 have different numbers of inputs (specifically 51, 59, 59, 59, 55, 59, 60, 47, and 50 respectively) to optimize the interconnect wiring layout. The three stages of XOR of one syndrome generator provide the parity of a subset of the one hundred and twenty eight data bits. This generated parity bit is then compared to a corresponding one of the stored check bits for that error correction word. The comparison operation, which is the XOR of a specific subset of PDL lines 15 and their corresponding stored check bits is executed by 1S, 2S and 3S. For the purposes of illustration, assume the arrowhead going into bus 32 is the result of this XOR operation. This XOR result is referred to as a syndrome bit, which is coupled to a respective line of a syndrome bus 32. The syndrome bus 32 is 18 bits wide (it carries the true and complement of each of the 9 syndrome bits). The inputs to the first stage S1 of each syndrome generator 30S1–30S9 are subsets of the 128 data bits. Each syndrome generator receives a unique set of data bits, in accordance with the error correction code requirements. In other words, these XOR inputs are wired to calculate the parity of selected subsets of the 128 bit data word according to a parity check matrix defining the error correction code used.

The bits of the syndrome bus are provided to the inputs of 128 NOR gates 36, one for each of the 128 data bits for the error correction word. The NOR gates work the same way as convention address decoders; the syndrome bits in combination indicate which of the 128 PDLs are carrying a bad bit. The outputs of the NOR gates 36 are sent to one input of XOR gates 38, each of which also receive a corresponding data bit. Should a given NOR gate indicate that its corresponding PDL is carrying bad data, the corresponding XOR 38 will simply invert the data on that PDL.

The data bits as corrected by the ECC are then passed by data lines 35 at the output of the XORS 38 to SRAM 40. The SRAM (or data register) 40 consists of a plurality of conventional four-device cross-coupled cells. From the SRAM, data is passed to the I/O pin 50 under the control of clock drivers (not shown) activiated during the CAS cycle to select and drive data from one or more of the SRAM cells.

Figure 2A:
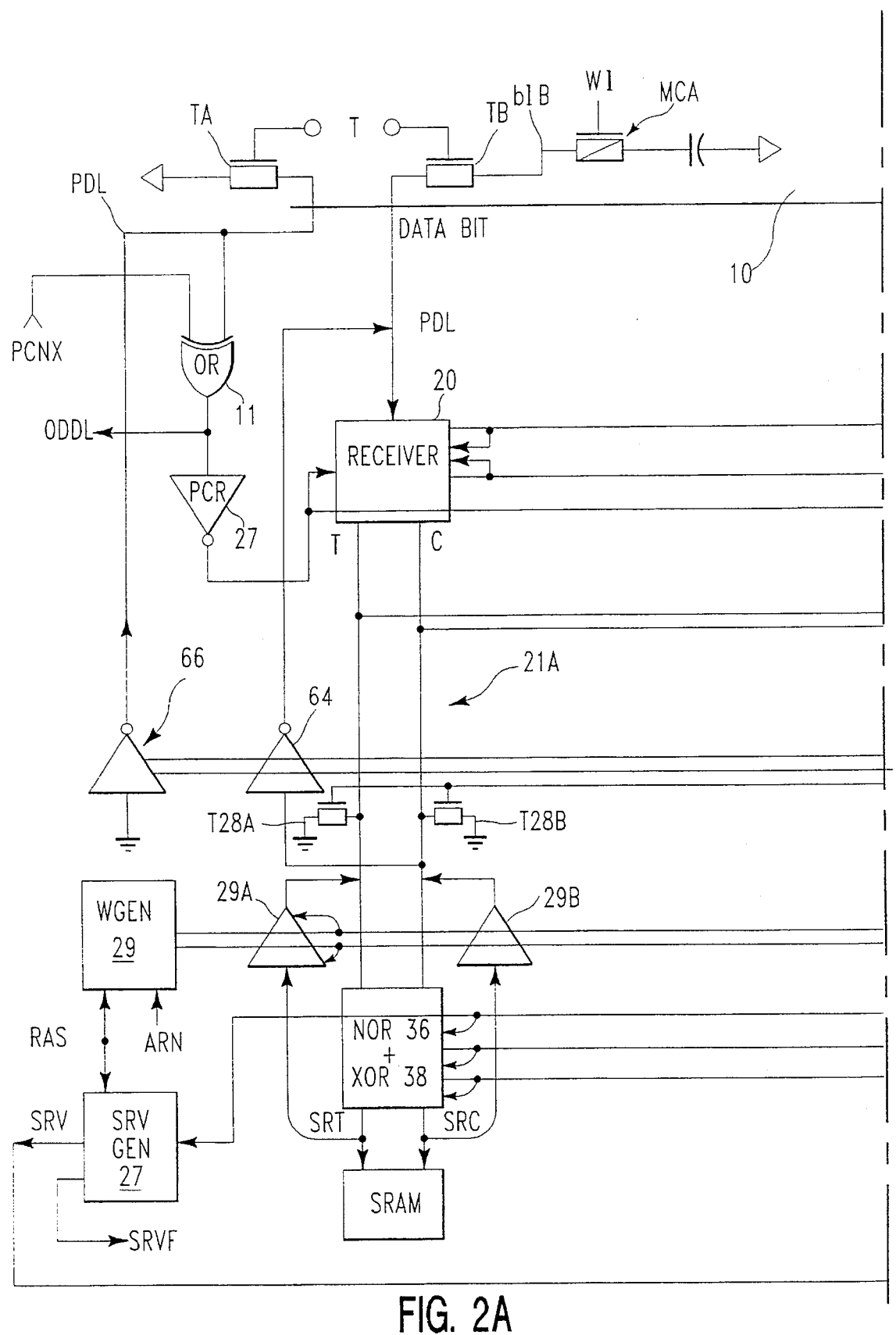
FIG. 2 is a detailed block diagram of the ECC system of FIG. 1.
Figure 2B:
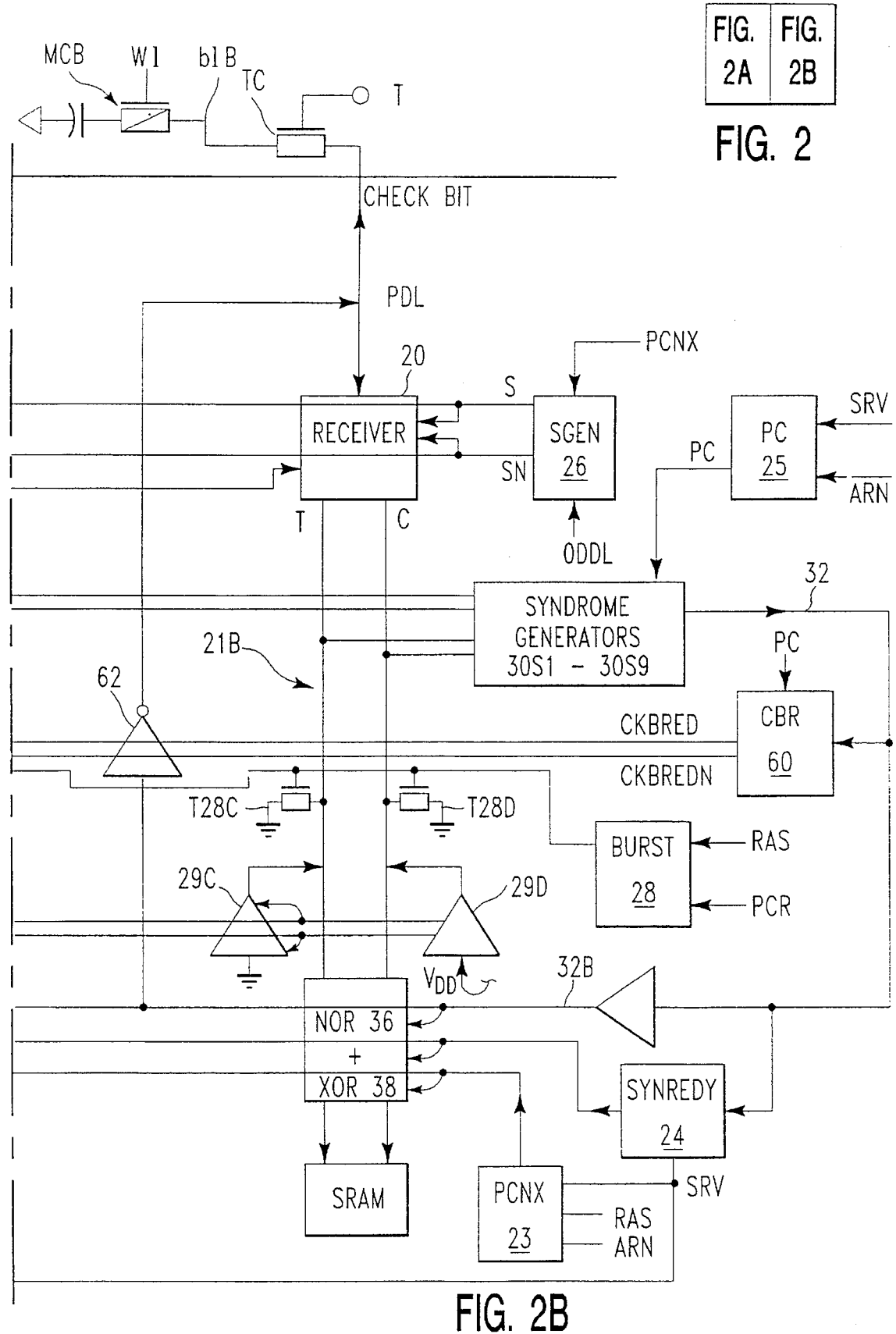

Referring now to FIG. 2, the interlocked ECC system utilized in the invention will be described in detail. In the description to follow, reference will be made to a "fetch" operation (wherein data is transferred from the DRAM array 10 through the ECC 30 to the SRAM 40) and to a "write-back" operation (wherein data is transferred from the SRAM 40 through the ECC 30 to the DRAM array 10). The ECC circuitry utilized in the invention receives 128 data bits and 9 check bits for each ECC word. For ease of illustration, these bits are shown schematically as a single data bit DB and a single check bit CB.

Figure 3:
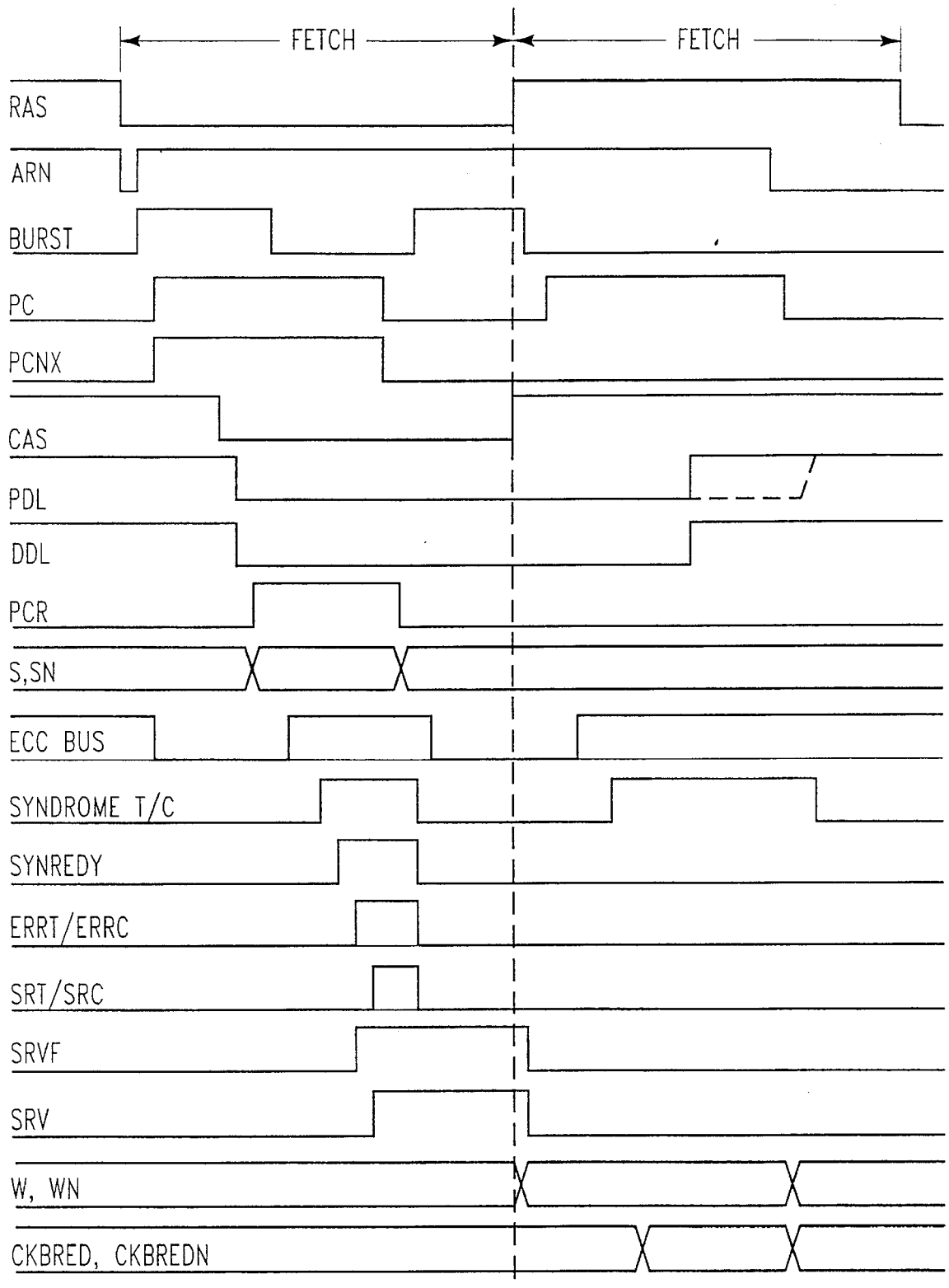
FIG. 3 is a waveform diagram showing the states of various signals within the ECC system of FIG. 2.

First, the fetch operation of the invention will be described with reference to both FIG. 2 and the waveform diagram of FIG. 3. Prior to initiation of the fetch cycle, both RAS and CAS are high, and the various clock drivers are in their restore state. The start of the fetch cycle is indicated by the falling edge of RAS. RAS going low causes the signal ARRAY RESTORE PHASE (ARN) to rise. ARN is used to take the ECC circuitry directed to fetching out of restore. Specifically, ARN rising drives the PC and PCNX generators 23, 25 high, which readies the syndrome generators 30S1–30S9 as well as the NOR/XOR gates 36, 38 to receive inputs. At the same time, ARN rising enables the T/C receivers 20 to begin operation. At the falling edge of RAS, BUSRST 28 turns on to clamp the ECC busses 21A–21D to ground via NMOS devices 28A–28D, respectively.

As shown in FIG. 2, one of the PDLs from the DRAM array 10 is a dummy PDL (or DDL). The DDL provides the same general performance characteristics as the FDLs coupled to the memory cells. In other words, the DDL is coupled to a ground line via a device TA that has the same performance characteristics as the bit switch devices TB, TC that couple the normal PDLs to the bit lines b1A, b1B coupled to the selected word line w1 via memory cells MCA, MCB, respectively. Note that transfer devices TA–TC are enabled by the same signal T in practice, the signal enabling device TA would be derived from (e.g. a NOR of) all the transfer signals; signal T couples selected bit lines to the PDLs. The DDL conductor itself is formed the same time as the PDLs' thus, since it is driven by a device having approximately the same size as the PDL drivers TB, TC, it will have the same rise/fall times as the PDLs.

The DDL is precharged high, as are the PDLs. When the bit switches TB, TC of the memory array are turned on by the column decoders providing signal T once CAS falls, the coupling device of the DDL TA turns on to discharge the DDL to ground. As a practical matter, the loading on the DDL is slightly greater than that of the normal PDLs such that the DDL simulates the worst-case delay associated with the normal PDLs being set to their respective logic states. The DDL is coupled to a large buffer 27 (actually a series of two conventional CMOS inverters) by means of a 2-input OR device having a second input coupled to logic restore phases PCNX, which is high during the early portion of the fetch cycle. The output PCR of buffer 27 is sent to the ECC T/C receivers 20.

Figure 4:
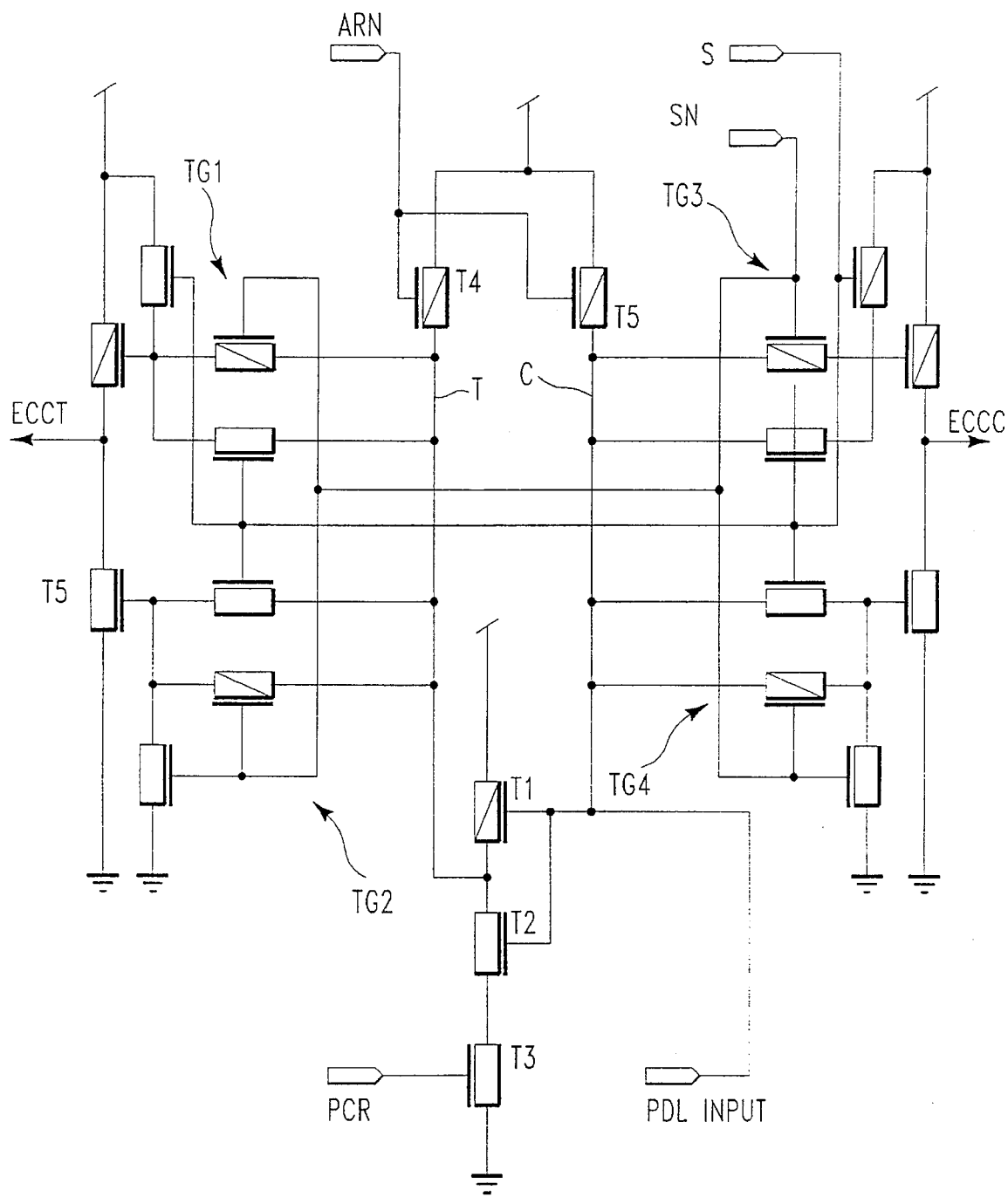
FIG. 4 is a circuit diagram of the ECC T/C receivers 20.
Figure 5:
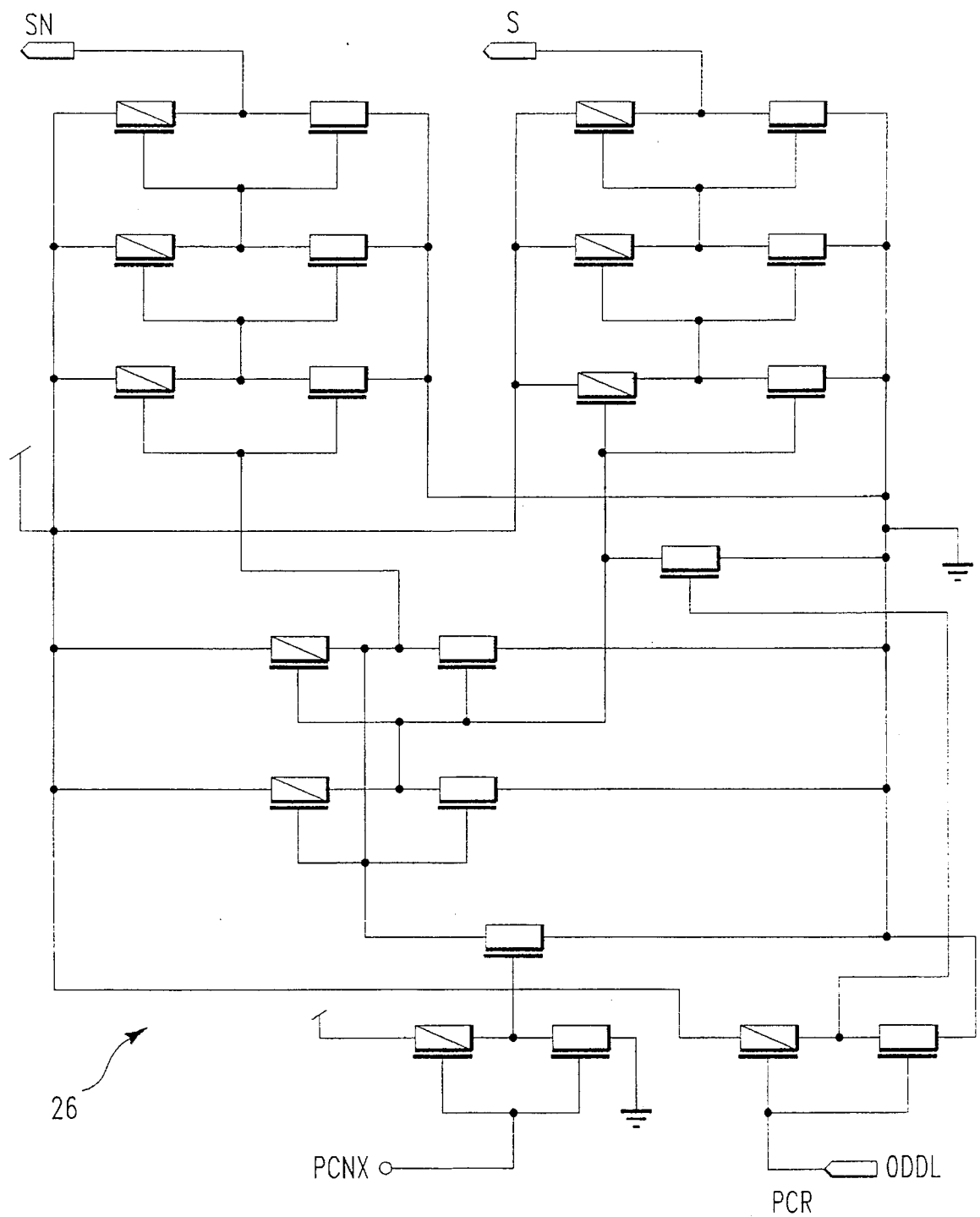
FIG. 5 is a circuit diagram of the SGEN generator 26.

The ECC T/C receivers 20 are shown in detail in FIG. 4. The ARN signal rising turns off PMOS devices T4, T5, allowing the differential lines T,C to float. The S and SN signals from SGEN 26 (particularly, with S being high and SN being low) provide enable inputs to the CMOS transmission gates TG1–TG4. As shown in FIG. 5, SGEN 26 is enabled by PCNX, and generates buffered S, SN outputs when ODDL (the unbuffered version of PCR, taken from the output of OR gate 11) falls. Referring back to FIG. 4, the receiver 20 is not completely enabled until it receives the signal PCR from the dummy PDL that turns on NMOS T3. With T3 on, the CMOS inverter T1, T2 is activated, such that if the data from the PDL input is highs line T will be set to a low state and line C will be set to a high state, which will be passed by the respective CMOS transmission gates TG1–TG4 to the inverting outputs, such that ECCT will be high and ECCC will be low. Thus, by virtue of the interlocking function provided by the DDL, the ECC T/C receivers 20 will not set the ECC busses 21A, 21B until the PDL inputs thereto are valid. By "valid," we mean that the PDL has been pulled sufficiently low (at least to the "maximum positive down level (MDDL)," which is the highest voltage indicating a binary logic state of 0) such that the data thereon can be reliably read. In the case of CMOS, the MPDL is on the order of 0.7 volts, and the "minimum positive up level (MPUL)" (the lowest voltage indicating a binary logic state of 1) is on the order of 1.4 volts. This interlock prevents the input to ECC of erroneous data due to setting the ECC busses prior to adequate signal development on the PDLs. At the same time, because the remaining circuitry (the internal T/C lines, the CMOS transmission gates) of the receivers 20 are enabled just prior to the PCR signal by ODDL, once the PCR signal rises the receiver can operate without further delay.

Note from FIG. 2 that the ECCT, ECCC outputs of ECC T/C receivers 20 (corresponding to ECC busses 21A, 21B are held at ground by BUSRST during the early part of the fetch cycle. When PCR rises, the BUSRST generator 28 lowers the BUSRST signal, such that the ECC bus lines 21A, 21B can be driven by the ECCT, ECCC outputs of the receivers 20.

Figure 6:
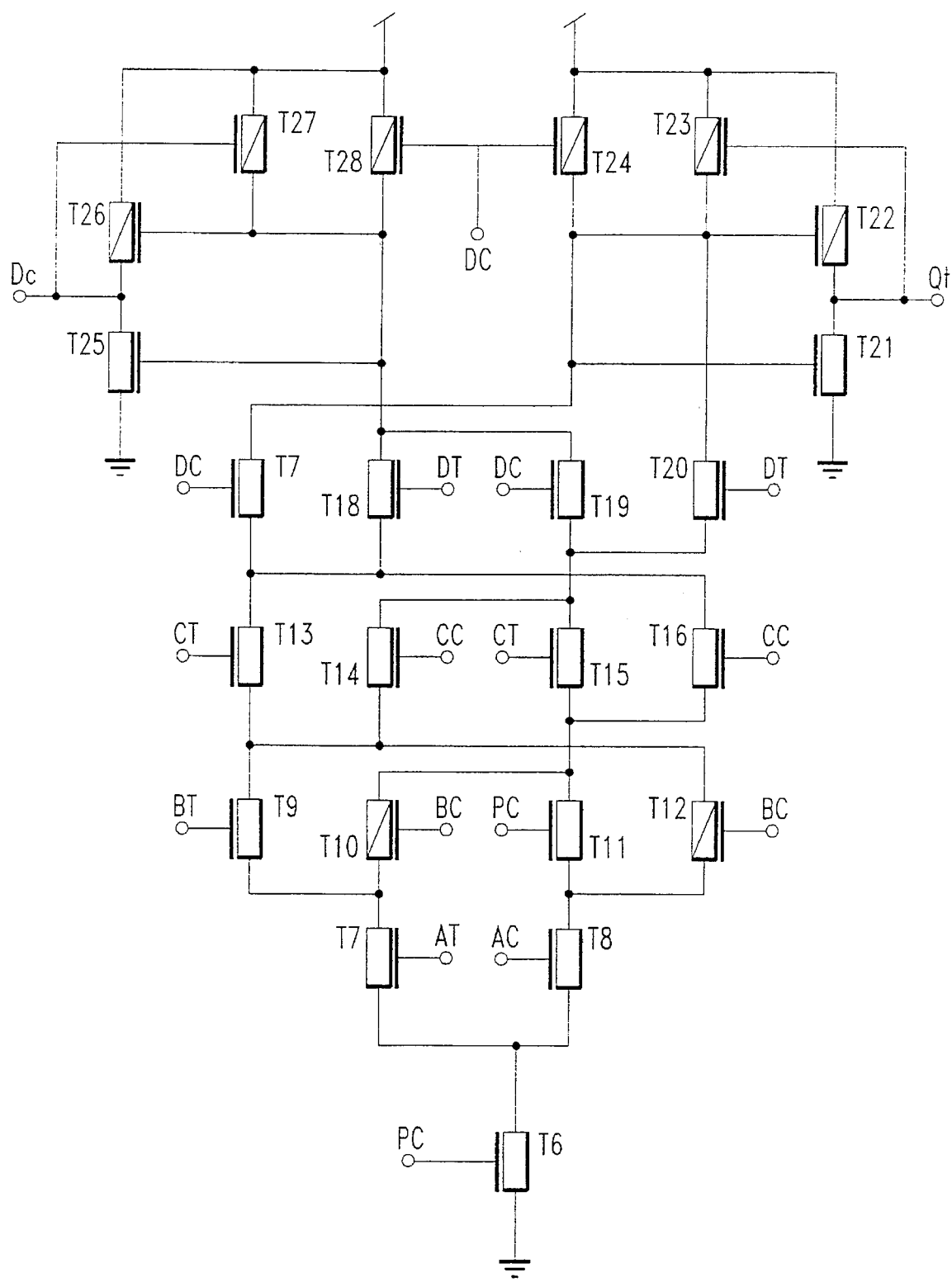
FIG. 6 is a circuit diagram of one of the DCVS XOR gates within one of the syndrome generators 30S1–30S9.

As previously described, the data from the ECC busses is passed to the DCVS syndrome generators 30S1–30S9, which in turn provide the syndromes onto the 9-bit syndrome bus 32. While as a practical matter the XOR gates within syndrome generators 30S1–30S9 could be provided using any conventional logic, it is preferred that differential cascode voltage switch (DCVS) logic be utilized. DCVS is described in detail in U.S. Pat. No. 4,570,084, issued February 1986 to Griffin et al, the teachings of which are incorporated herein by reference). FIG. 6 is a circuit diagram of a DCVS 4-input XOR. Transistors T7 through T2O form the N-type combinational logic of a 4-input XOR function with differential inputs AT, AC to DT, DC. Since phase PC is driven high at the start of the fetch cycle, the differential output of the XOR of differential inputs A,B,C and D from T/C receivers 20 is driven to nodes Qt and Qc by inverters formed by T21, T22, T25 and T26. Leakage protection is provided by soft latching action of T23 and T27. Note that the syndrome generators are self-timed; that is, there are no enable/trigger clock signals that activate the syndrome generators as there are for the T/C receivers 20. The syndrome generators are effectively synchronized by clocking of the the T/C receivers. That is, because the operation of the T/C receivers insures that the T/C inputs to the syndrome generators are valid, there is no need for independent clocking for the syndrome generators.

Figure 7:
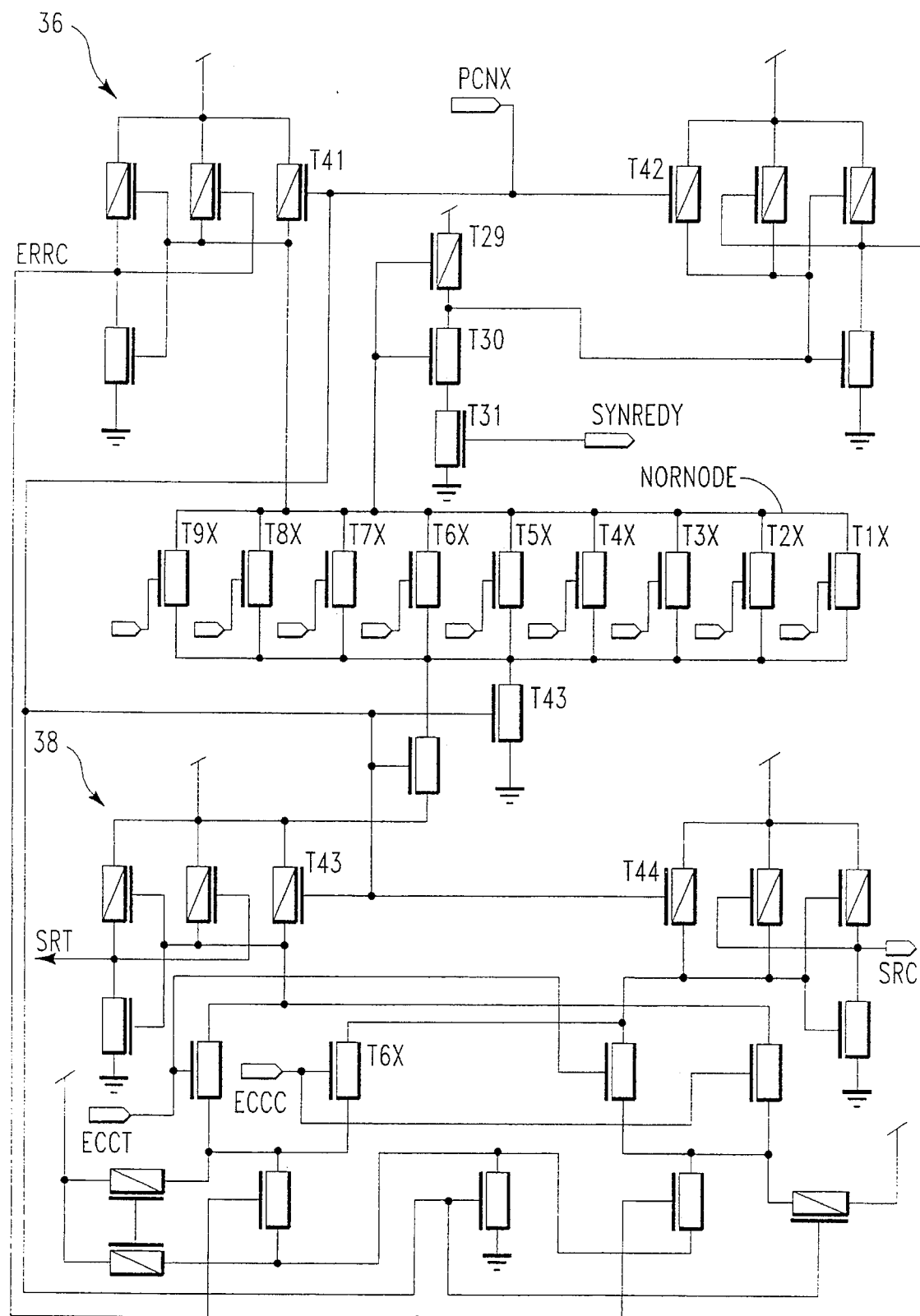
FIG. 7 is a circuit diagram of the NOR/XOR logic 36, 38.
Figure 8:
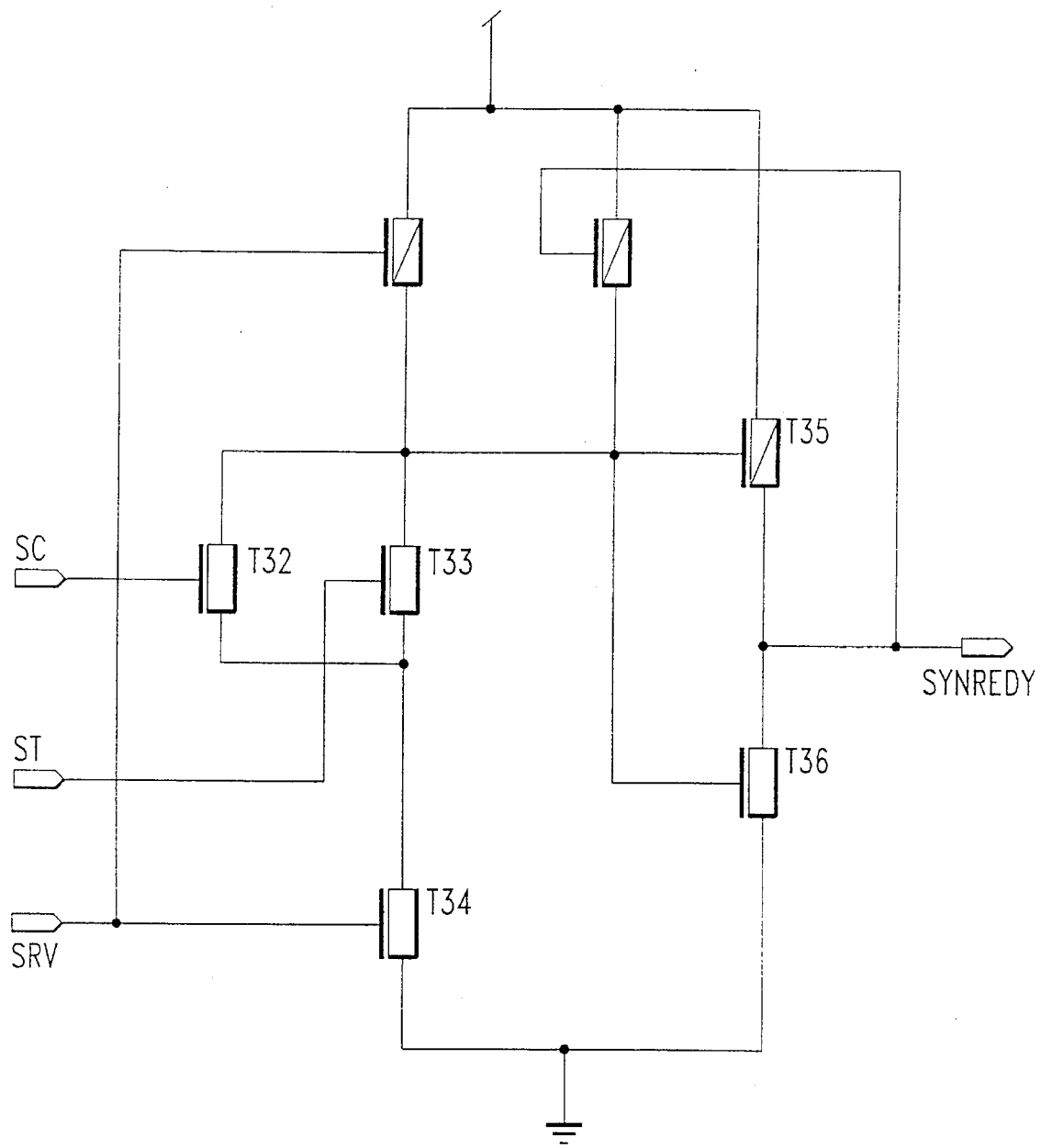
FIG. 8 is a circuit diagram of the SYNREDY clock generator 24.

The NOR/XOR logic 36, 38 are shown in more detail in FIG. 7. Note that the output of the NOR node within block 36 defined by NMOS transistors T1X–T9X is enabled by NMOS T31, which receives an interlock pulse SYNREDY from SYNREDY generator 24. The ERRC output will rise at the falling edge of NORNODE. On the other hand, ERRT will rise if NORNODE remains high, and only when SYNREDY enables clocked inverter formed by T29–T30. As shown in FIG. 8, the SYNREDY generator 24 produces an output when one of the syndrome bits SC, ST from syndrome bus 32 rise to indicate that syndrome bus 32 is active. Note that the relative sizes of devices T32–T34 are set such that the SYNREDY pulse is not generated until the SYNDROME inputs to T1X–T9X of the NOR node of NOR gate 36 are valid and NORNODE is at its valid level. Specifically, these devices are significantly longer/wider than the devices that make up the NOR node, to introduce a discrete delay. Briefly, when either SC or ST rise, the corresponding transistor T32, T33 will turn on, coupling the gate of PMOS T35 low, such that the SYNREDY output rises through inverter T35, T36. Thus, the generation of the ERRT, ERRC pulses is interlocked with the generation of syndrome data. More specifically, the output of the NOR node within block 36 is not enabled until the SYNREDY pulse rises to indicate that sufficient time has passed since the syndrome bits were valid to assure proper operation of the NOR decode. Again, this prevents premature outputs from the NOR decoder from erroneously indicating an error condition.

The remaining operations of the system (i.e., firing of the XORs within block 38 to correct the bad bit, and passage of the data bits as corrected to the SRAM registers) are self-timed, relying on the above self timed nature of DCVS logic gates. Specifically, the XOR 38 receives ERRT, ERRC from NOR 36 and ECCT, ECCC from the T/C receivers 20, and carries out an XOR operation to provide the outputs SRT, SRC that are sent to the data registers 40.

Figure 9:
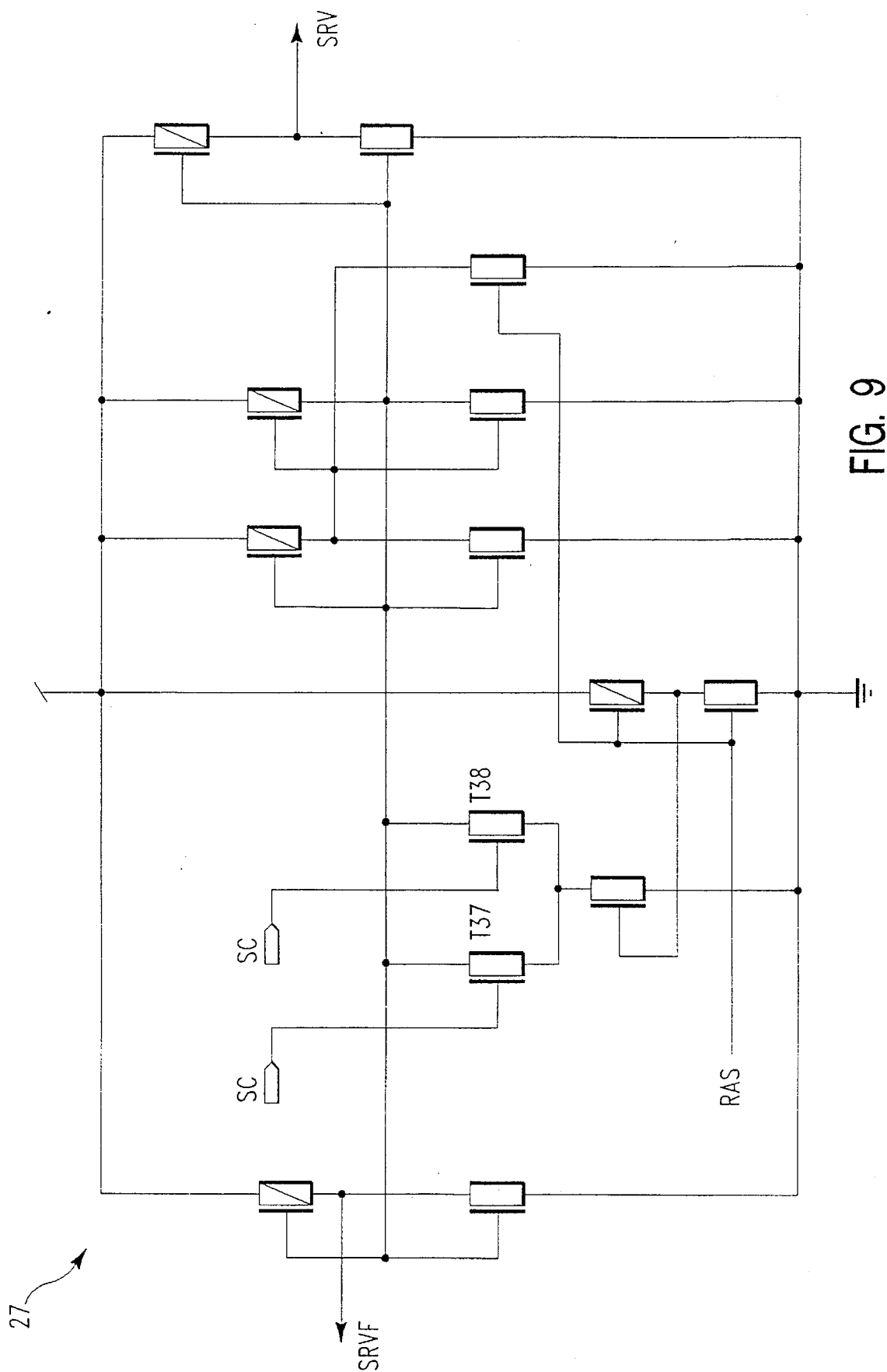
FIG. 9 is a circuit diagram of the SRV generator 27.

After the fetch operation as described above, the ECC circuitry must be restored so that it can be driven quickly during a subsequent write-back cycle. This restore is triggered by the SRV generator 27. The SRV generator as shown in FIG. 9 receives its inputs SC, ST from the bus 32B. The SRV and SRVF outputs of generator 27 will rise when the syndrome bits on bus 32B are valid by turning on one of devices T37, T38. These SRV and SRVF signals are used for different purposes. First, SRVF rises to enable the clock driver (not shown) that controls the transfer of corrected data latched by the SRAM cells to the I/O pads of the chip. Because these clock drivers add considerable inverter delays, SRVF is generated before the SRAM nodes are actually valid. That is, the delay associated with the clock drivers is factored into the SRVF timing, such that by the time the clock drivers enable data transfer from the SRAM, the data therefrom will be valid. SRV rises approximately 3/10 nanoseconds after SRVF, to restore the ECC circuitry. Again, although SRV is generated prior to the SRAM nodes being actually valid, the inverter delays associated with restoring the ECC circuitry are such that by the time the circuit outputs are driven to their restore states the SRAM nodes will be valid. Thus, ECC restore is timed to occur at the end of the RAS cycle, and is interlocked to the provision of valid data to the SRAM register blocks. This prevents the ECC from being restored until it has had an opportunity to process the DRAM data. Moreover, the driver devices of SRV are sized such that the SRV signal will rise after the SRT and SRC outputs of the ECC error indicator and corrector blocks have updated the SRAM cells with the correct data.

Figure 10:
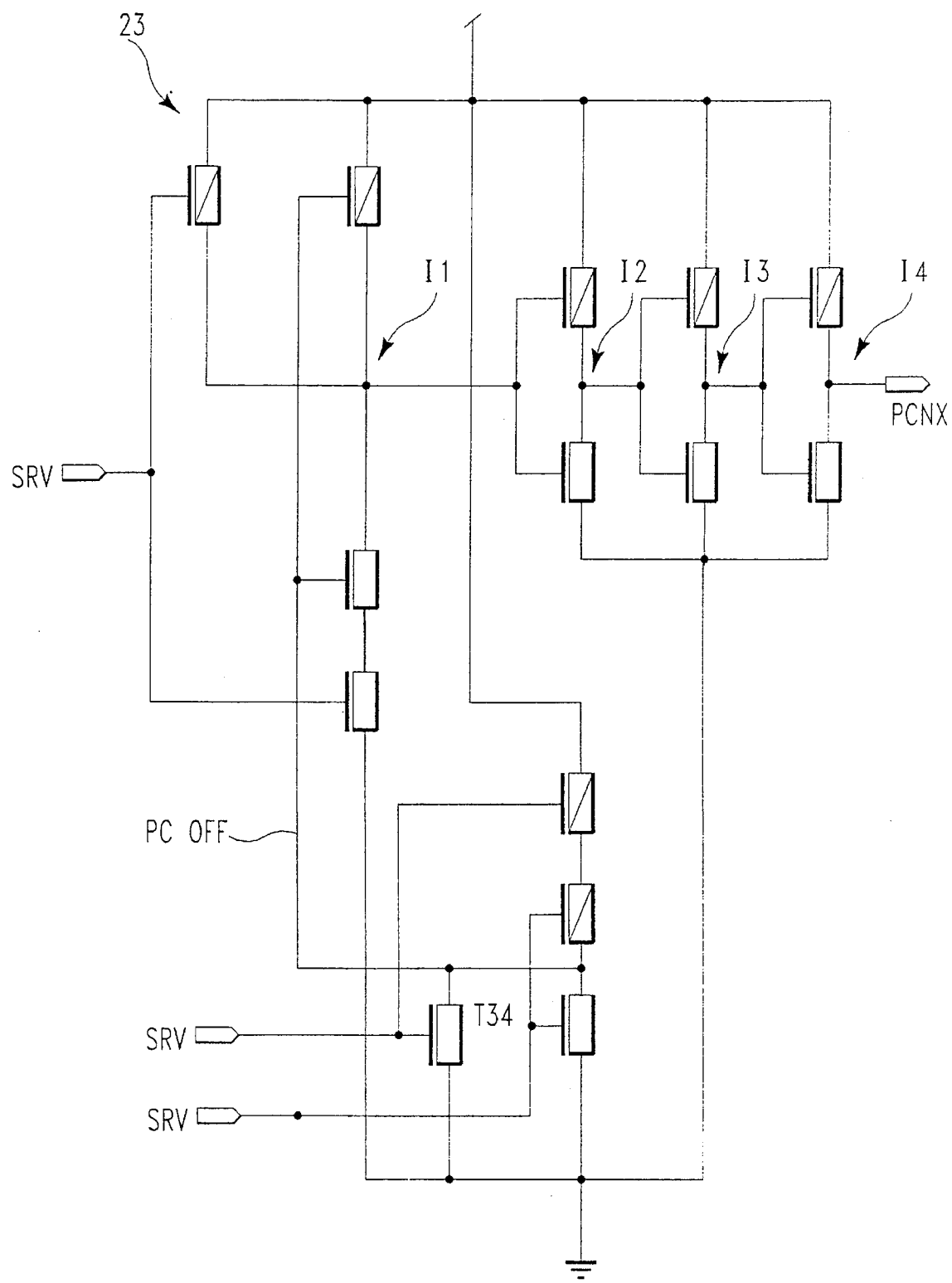
FIG. 10 is a circuit diagram of the PCNX clock generator 23.

As shown in more detail in FIG. 10, SRV rising will turn turn off the PCNX output of generator 23, to disable the ECC error detection and correction circuitry 36, 38. Specifically, when SRV rises NMOS T40 will turn on, coupling node PCOFF to ground. PCOFF forms the input to four inverter stages I1–I4, that buffer the PCNX signal to drive the large load presented by the NOR/XOR block 36, 38. Thus, the PCNX output is driven low. Referring back to FIG. 7, note that the PCNX input disables the ERRC, ERRT outputs by turning off devices T41, T42; disables the NOR node by turning on device T43; and disables the XOR drivers by turning on PMOS devices T43–T44. The falling edge of PCNX also causes the S, SN outputs of SGEN 26 to change state, which turns off the CMOS transmission gates TG1–TG4 of the ECC T/C receivers 20. The falling edge of PCNX also turns off the OR gate 11, such that PCR falls to both disable the PDL inputs of the ECC T/C receivers 20 and restore the ECC busses 21A, 21B to ground by raising the output of the BUSRST generator Finally, SRV also drives the output of PC generator 25 low, disabling the DCVS logic of the syndrome generators (See FIG. 6).

The write-back cycle will now be described. With reference to FIGS. 2 and 3, the start of the write-back cycle is indicated by RAS rising. RAS going high restores the SRV generator 27, causing both SRV and SRVF outputs to fall to ground shortly after RAS rises. The rising edge of RAS also serves to reset the BUSRST generator 28, such that the ECC busses 21A, 21B are disconnected from ground by turning off the NMOS devices 28A–28D. The fall of SRV serves to pull the PC generator 25 out of restore, to again enable the syndrome generators 30S1–30S9.

Figure 11:
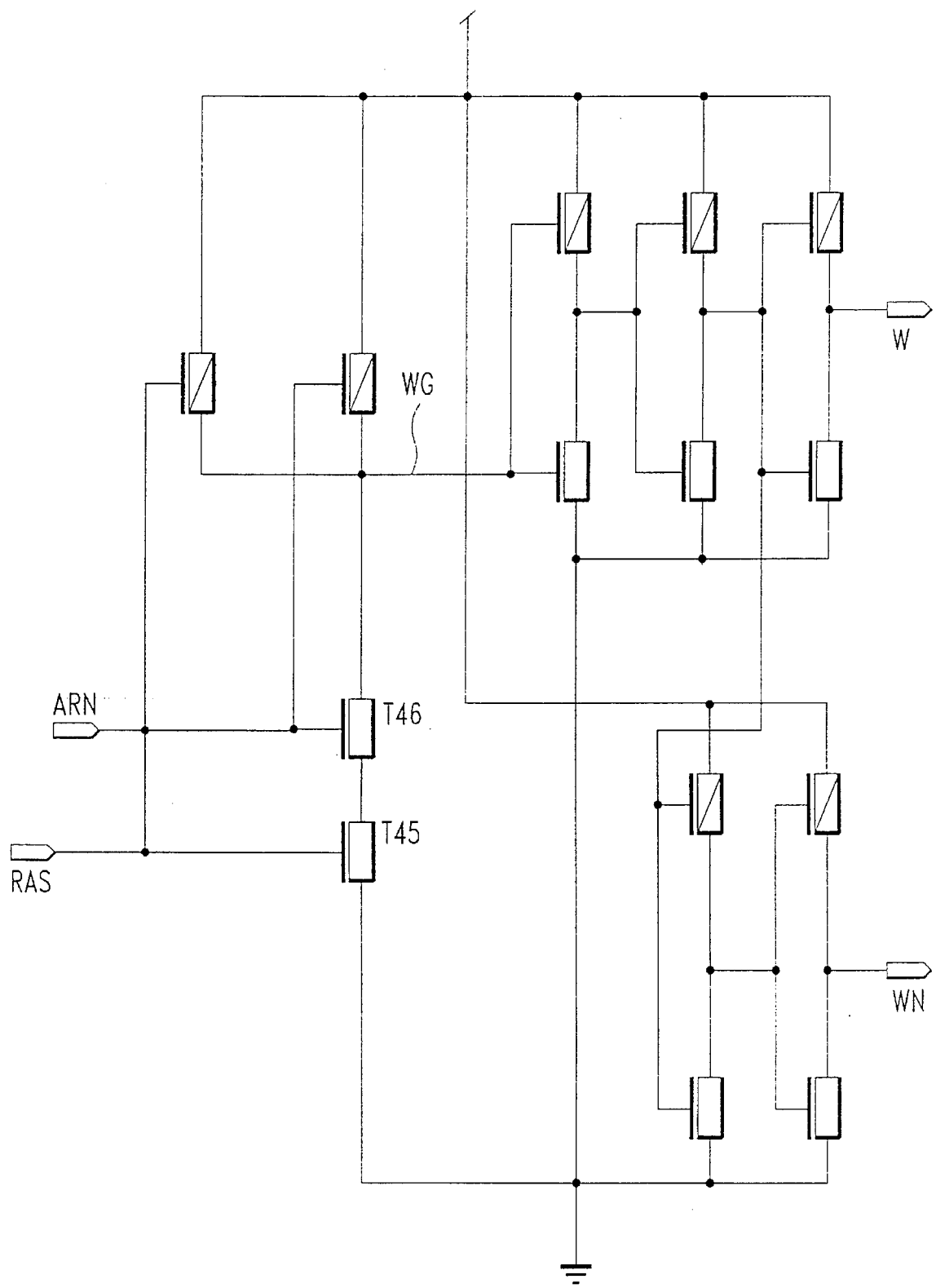
FIG. 11 is a circuit diagram of the WGEN generator 29.

As shown in FIG. 11, the rising edge of RAS also serves to turn on device T45 of the write generator WGEN 29. Since ARN is still high at this time, the node WG is pulled low, pulling the W output high and the WN output low. These signals are fed to SRAM buffers 29A–29D. During a write-back cycle, the SRAM buffers 29A, 29B receive data bits SRT, SRC from each of the SRAM cells. This reception is enabled by the W, WN signals, which cause the SRAM buffers 29A, 29B to pass the SRT, SRC bits to respective lines within the ECC bus 21A. However, in the case of the SRAM buffers 29C, 29D, note that their inputs are wired to ground and Vdd, respectively (that is, when enabled by the W, WN signals, the SRAM buffers 29C, 29D pass ground and Vdd, respectively, to the ECC bus lines 21B). In combination, these signals provide a logical input of "0" to the ECC bus 21B, such that all the check bit inputs to the syndrome generators 30S1–30S9 are zero.

This is done because the syndrome generators are used to generate new check bits for the data during the write-back cycle. As previously described, the input data bits are applied to the ECC bus 21A. As described with reference to the fetch cycle, the syndrome generators 30S1–30S9 will generate check bits based on this data. However, because all of the input check bits are "0," the generated check bits will be directly passed to form new check bits (that is, unlike the fetch operation, a comparison between the newly-generated check bits and the old check bits is not carried out).

Once the new check bits are generated by syndrome generators 30S1–30S9, they are passed onto the syndrome bus 32 as described for the fetch cycle. As the check bits are passed to the bus, one of them is sent to the check bit read (CBR) generator 60. The CBR generator is configured the same way as the syndrome ready SYNREDY generator 24, and it performs the same function of providing an output (in this case, by switching its output states such that CKBRED is high and CKBREDN is low) when the bits on the syndrome generator 24 have risen sufficiently such that their logic states can be reliably processed. These signals enable the write-back inverter 62 to pass the newly-generated check bits from the syndrome bus 32 to the PDL corresponding to the ECC bus 21B.

Figure 12:
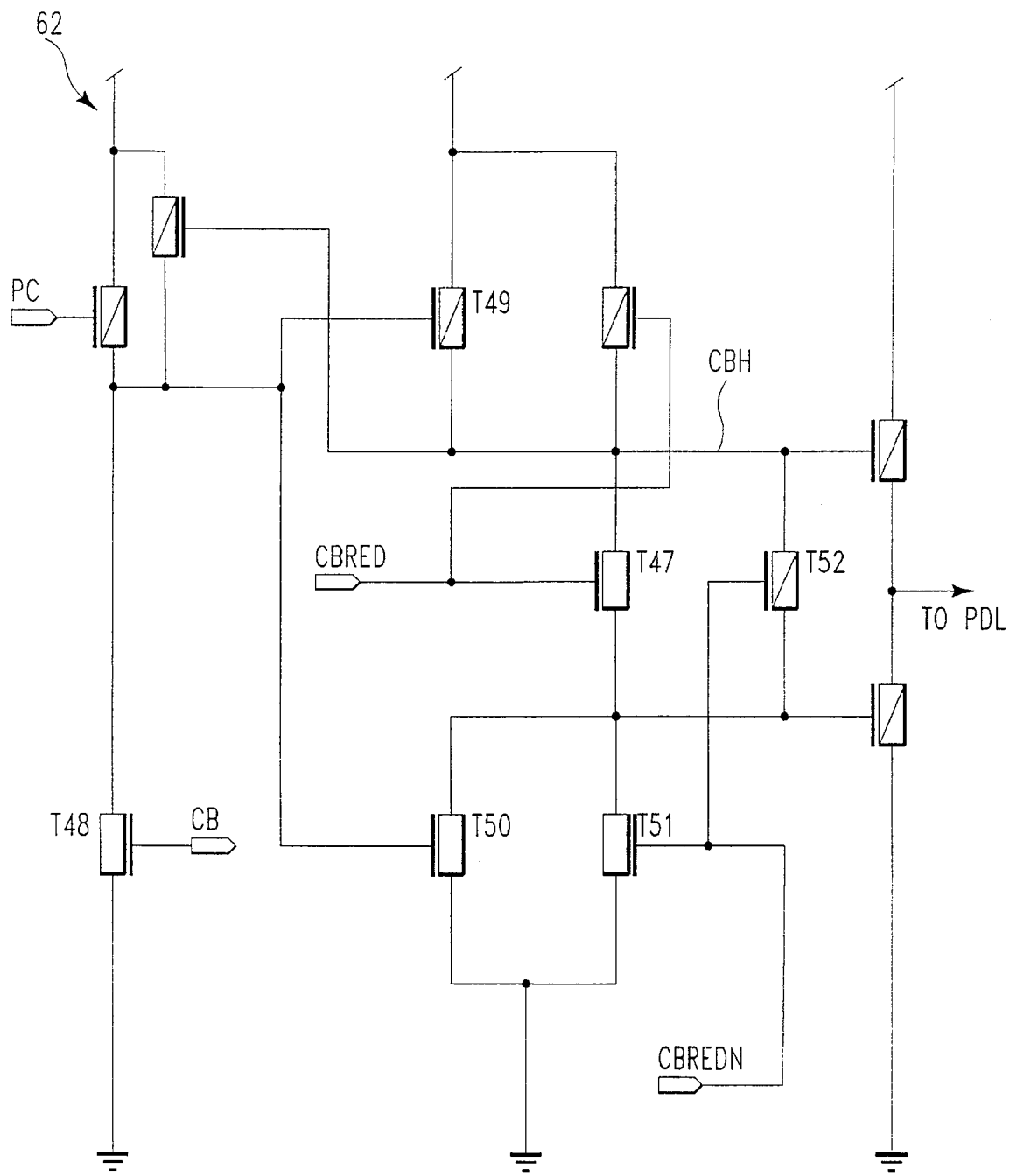
FIG. 12 is a circuit diagram of the write back drivers 62–66.

Write-back inverter 62 is shown in detail in FIG. 12. When CBRED is high, NMOS T47 is on. If the input check bit CB is high, NMOS T48 will turn on, pulling the input to T49 and T50 low. Thus, T47 will be isolated from ground while T50 turns on to clamp node CBH high, so as to supply a high signal to the PDL output. If the check bit CB is low, device T47 is connected to ground via NMOS T50, such that node CBH (which was set high during standby by signal PC) will be pulled to ground so as to provide a high signal to the PDL. Note that when CKBREDN falls (and CKBRED rises) at the end of the write-back cycle, NMOS T51 rises and PMOS T52 falls, to disable the inverter output. Thus, the new check bits are written to the corresponding PDL. Similarly, write-back inverter 64 couples the "complement" signal on ECC bus 21A (i.e., the input to the ECCC line of the T/C receiver 20) to the corresponding PDL.

An interlock is used to make sure that the DRAM arrays receive accurate data. In this case, the same dummy data line DDL is driven high, indicating to signal that the PDLs as driven by the write-back drivers 62, 64 have valid logic states. A dummy write-back driver 66 is coupled to the DDL, and is configured the same as the write-back driver of FIG. 12 except its CB input is permanently tied to GND. When the CBRED, CBREDN signals are generated, the dummy write-back driver 66 will drive the dummy data line up to Vdd with the same general timing as the other write-back generators. The DDL output is sent to clock drivers (not shown) that will provide enable signals to the sense amplifiers of the bit lines within the DRAM. Thus, similarly to the PDL—ECC T/C receiver data transfer, the transfer of data from the ECC circuits to the PDLs is interlocked by a dummy PDL, insuring that the data will not be read before it is valid.

The system is reset after write-back as follows. The rise of the DDL also enables the clock generator (not shown) that produces ARN to switch state. When this happens, the PC generator 25 is restored low, to bring signal PC low to turn off the syndrome generators 30S1–30S9. The fall of ARN also restores the CBR generator 60, disabling the write-back inverters 62 and 64 as well as the dummy write-back inverter 66. The fall or ARN also resets the write generator WGEN 29, to disable the SRAM buffers 29A–29D. Thus, all the circuitry is reset at the end of the cycle, facilitating enhanced performance.

2. Remaining Elements of the Invention

Section 1 above describes the preferred system and process by which data is fetched from memory and corrected to provide "clean" data. This Section discusses alternate embodiments of the remaining elements of the invention, by which subwords of the "clean" data are fetched and new correction bits are generated therefor.

Figure 13:
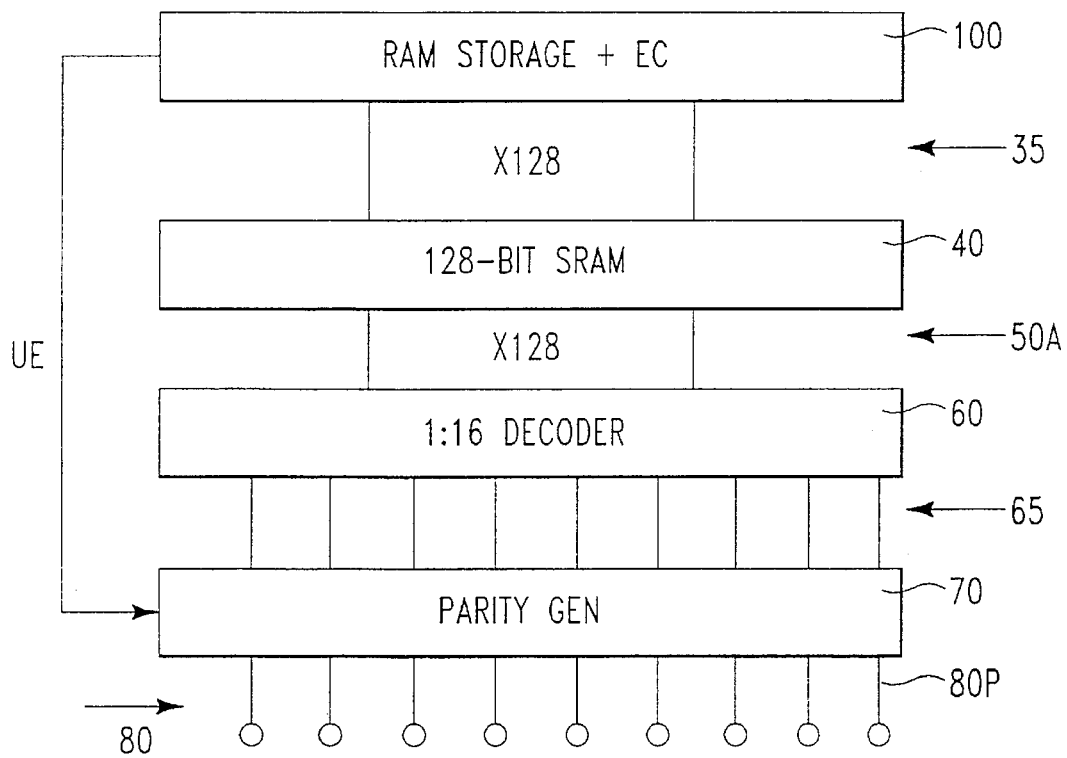
FIG. 13 is a block diagram of a first embodiment of the present invention.

FIG. 13 is a block diagram of a first embodiment of the invention. The RAM Storage and Error Correction (EC) block 100 is the same as the circuitry described in Section 1 above the data lines 35 feeding the SRAM 40 as shown in FIG. 1. Similarly, the data lines 35 and SRAM 40 are the same as the like-numbered elements of FIG. 1.

In FIG. 13, each of the 128 SRAM cells within SRAM 40 has its own output. As such, 128 output lines 50A originate from SRAM 40; in FIG. 1, the 128 SRAM cells shared a single output line 50. The 128 output lines pass through a 1:16 decoder 60, such that only 8 of the 128 SRAM outputs are sent to the parity generator 70. The 1:16 decoder receives column address signals A7–A9 to select which eight of the 128 data signals are to be passed to the parity generator. The decoder 60 comprises 16 conventional NOR decode nodes, each of which receive different combinations of the true, complement versions of the address signals. Each NOR node has an output enable line connected to the gate electrodes of PFET transmission gates coupled between a group of eight of the output lines 50A and the eight output lines 65. In any given access cycle, only one of the 10 NOR decoders will be active, such that only one group of 8 of the 128 SRAM outputs will be passed along lines 65 to the parity generator 70.

Figure 14:
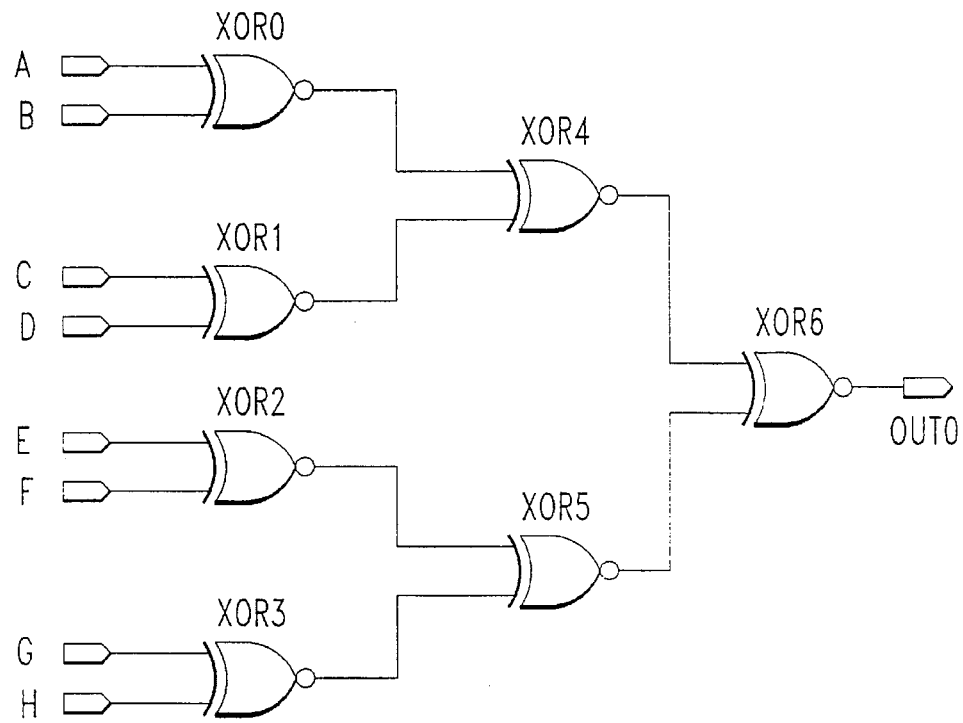
FIG. 14 is a circuit diagram of the parity generator of FIG. 13.

FIG. 14 is a detailed circuit diagram of the parity generator 70. The parity for the group of eight output lines 65 (inputs) A–H is generated by the exclusive OR (XOR) gates XOR0–XOR6. The four 2-input XOR gates XOR0-3 have their outputs XOR-ed by XOR4-6 to produce the output parity bit 80P. Note that XOR gates with greater than 2 inputs can be used to optimize the design for speed.

Thus, the nine outputs 80 and 80P from parity generator 70 to the data processing system utilizing the memory system of the Invention include a bit 80P that is generated without taking up extra memory space. At the same time, this extra bit is provided without compromising the fault recovery capabilities of the memory system. That is, the 128 data plus 9 check bit ECC system optimizes fault recovery while minimizing cost; by generating extra bits from a sub-word of the 128 corrected data bits, these efficiencies are retained. Since the memory storage 100 in FIG. 13 is actually a 4 Mb quadrant of a 16 Mb device, the nine outputs here would repeat four times (1/quadrant), such that the entire chip has 36 outputs. Obviously, the size of the RAM storage in 100 can be any size. In this example it was 4 Mb but could be 16 Mb, 64 Mb, etc.

Note the UE signal from the storage/error correction block 100 to the parity generator 70. The circuitry described in Section 1 above is capable of correcting single errors in the fetched data word. At the same time, it is capable of detecting when there are two errors in a data word, even though it is not capable of correcting both errors. Should a double error be detected, the logic produces an uncorrectable error (UE) signal, indicating that the fetched data word contains two errors and hence cannot be corrected. The UE signal is fed to the parity generator 70 to complement it. That is, we do not want to generate the correct parity bit for bad data. The UE signal is used to generate invalid parity, indicating the presence of faulty data.

Figure 15:
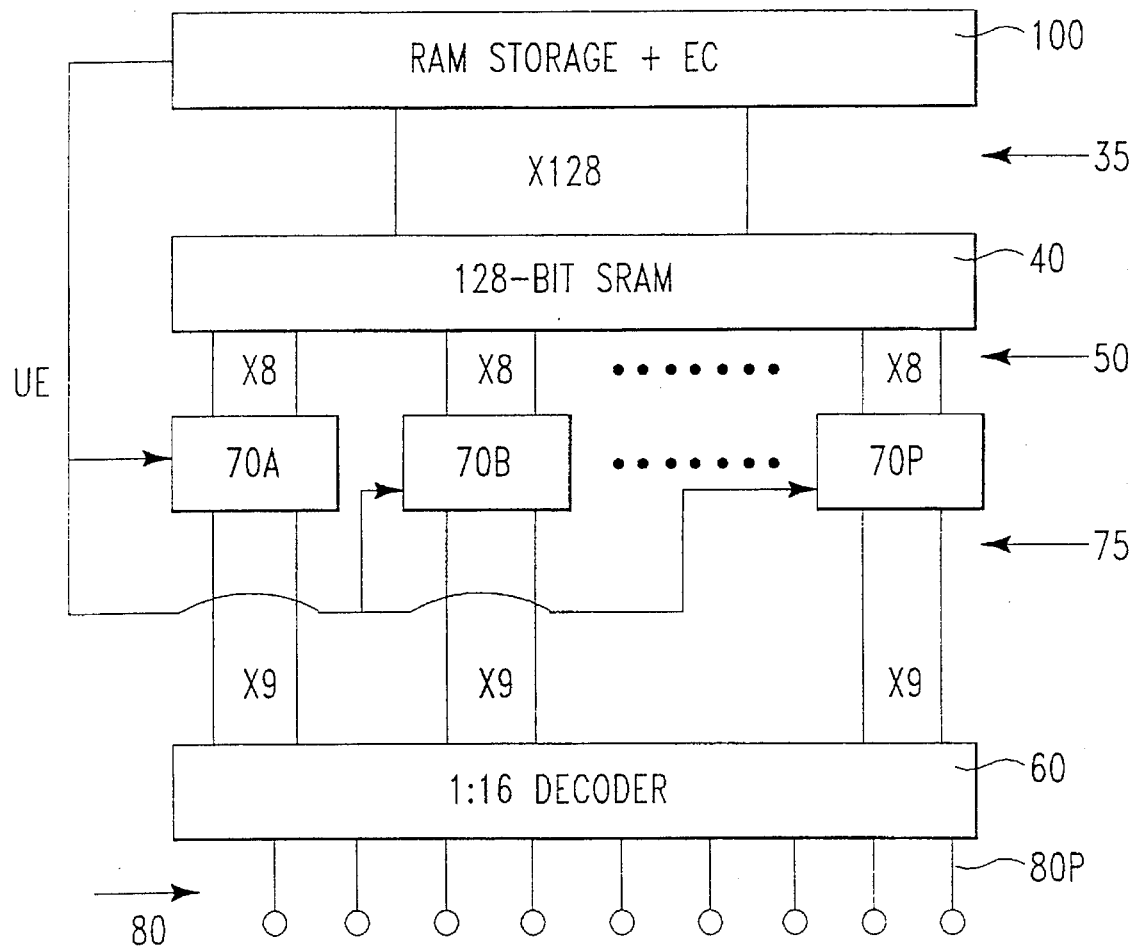
FIG. 15 is a block diagram of a second embodiment of the present invention.

FIG. 15 is a block diagram of a second embodiment of the invention. Elements in FIG. 15 that have the same reference numerals as those of FIG. 13 have the same structure/ function as those elements. In FIG. 15, the 128 SRAM outputs 50 are divided into 16 8-bit sections, each of which forms the input to a separate parity generator 70A–70P. That is, instead of a single parity generator servicing all of the SRAM outputs as in FIG. 13, here each group of eight SRAM outputs has its own dedicated parity generator. The 9-bit outputs 75 of the sixteen parity generators 70A–70P are then provided to a 1:16 decoder 60, to select a single set of outputs at the output 80, 80P. A particular aspect of this embodiment of the invention is that because the parity bit is generated for each group of eight bits from the SRAM, more than one group can be output at the same time without a performance penalty. That is, instead of a 1:16 decoder, we could use a 1:8 or 1:4 decoder, which would output 15 and 32 bits at a time from each quadrant of the chip, without increasing the cycle time due to multiplexing a single parity generator amongst the selected bit groups. In FIG. 15, note that the UE signal is now sent to all of the parity generators 70A–70P.

FIG. 10 is a block diagram of a third embodiment of the present invention. The RAM and ECC blocks have been omitted for clarity. Here, instead of showing a single quadrant of the chip, the output system for the entire chip is shown. Similarly to the first embodiment of the invention shown in FIG. 13, the 128 outputs of the SRAMs 40A–40D are sent to respective 1:16 decoders 60A–60D to select a single group of eight outputs from each quadrant. However, instead of generating a parity bit for each group as in FIG. 13, here the four groups of eight outputs are combined to form a 32-bit data word, which is processed through a Hamming ECC check bit generator 110 (having the same circuitry and operation as the check bit generator discussed in Section 1 above) to yield seven check bits. That is, the check bit generator 110 works the same general way as that described in conjunction with FIGS. 1–12, except that it works off of a different Hamming code, such that a 32-bit data word yields seven check bits. The 32 data bits are passed through lines 120D to the output; the seven check bits are passed through lines 120C to the output through seven XOR gates 132. The XORs receive a control signal UEC (or "UE Composite") from an OR gate 130, which receives UE signals from each of the four memory array quadrants. Is one of the quadrants sees an uncorrectable error, the corresponding UE signal will rise, causing the UEC signal to rise. UEC high causes one or more of the XORs to invert the value of the check bits to indicate faulty data. As a result, the chip has a 39-bit output, of which 32 bits originated from storage and 7 were generated. Put another way, in this embodiment slightly less than 20% of the output bits were generated as opposed to stored, such that the chip is 20% more area efficient.

Figure 16:
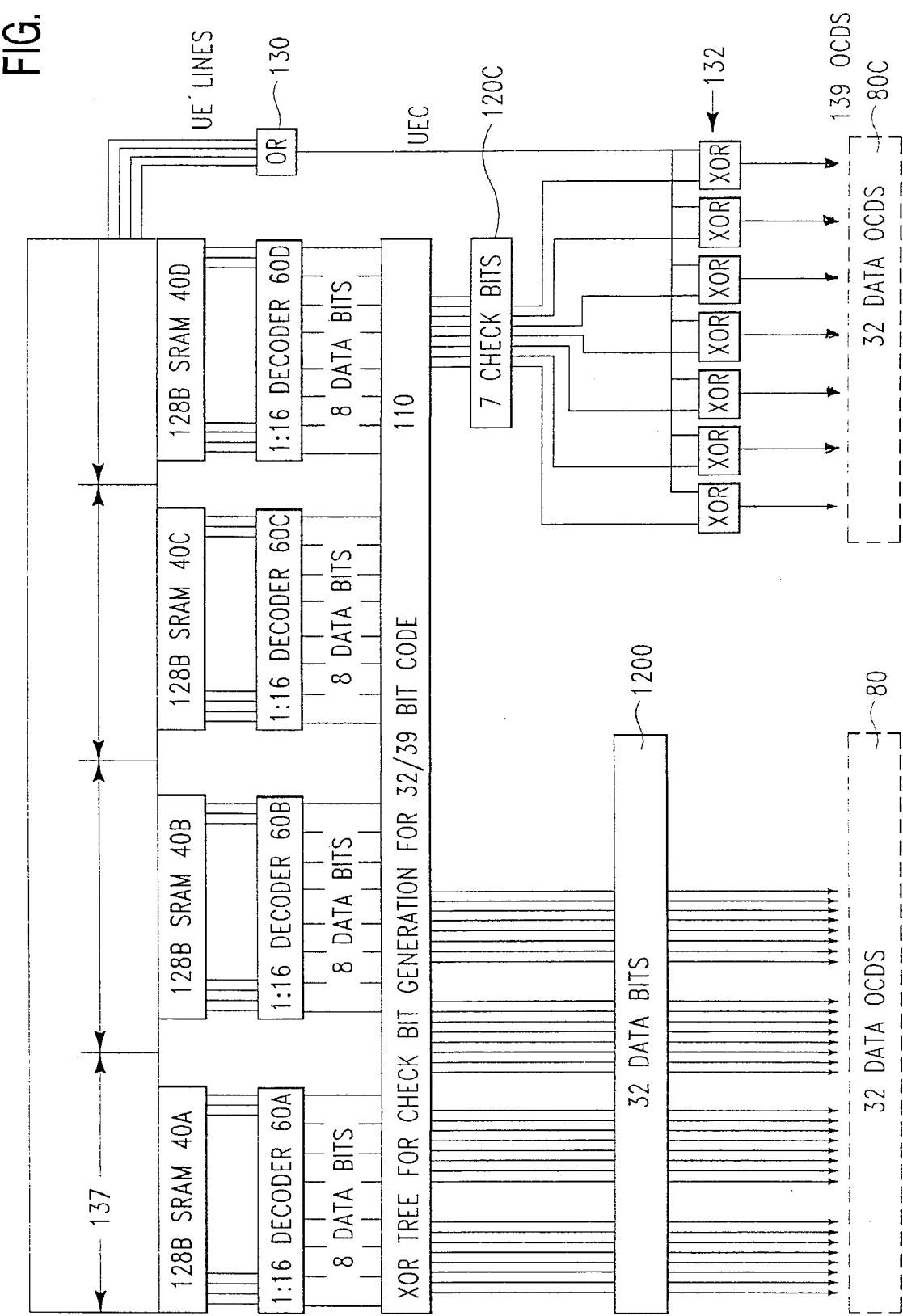
FIG. 16 is a block diagram of a third embodiment of the present invention.
Figure 17:
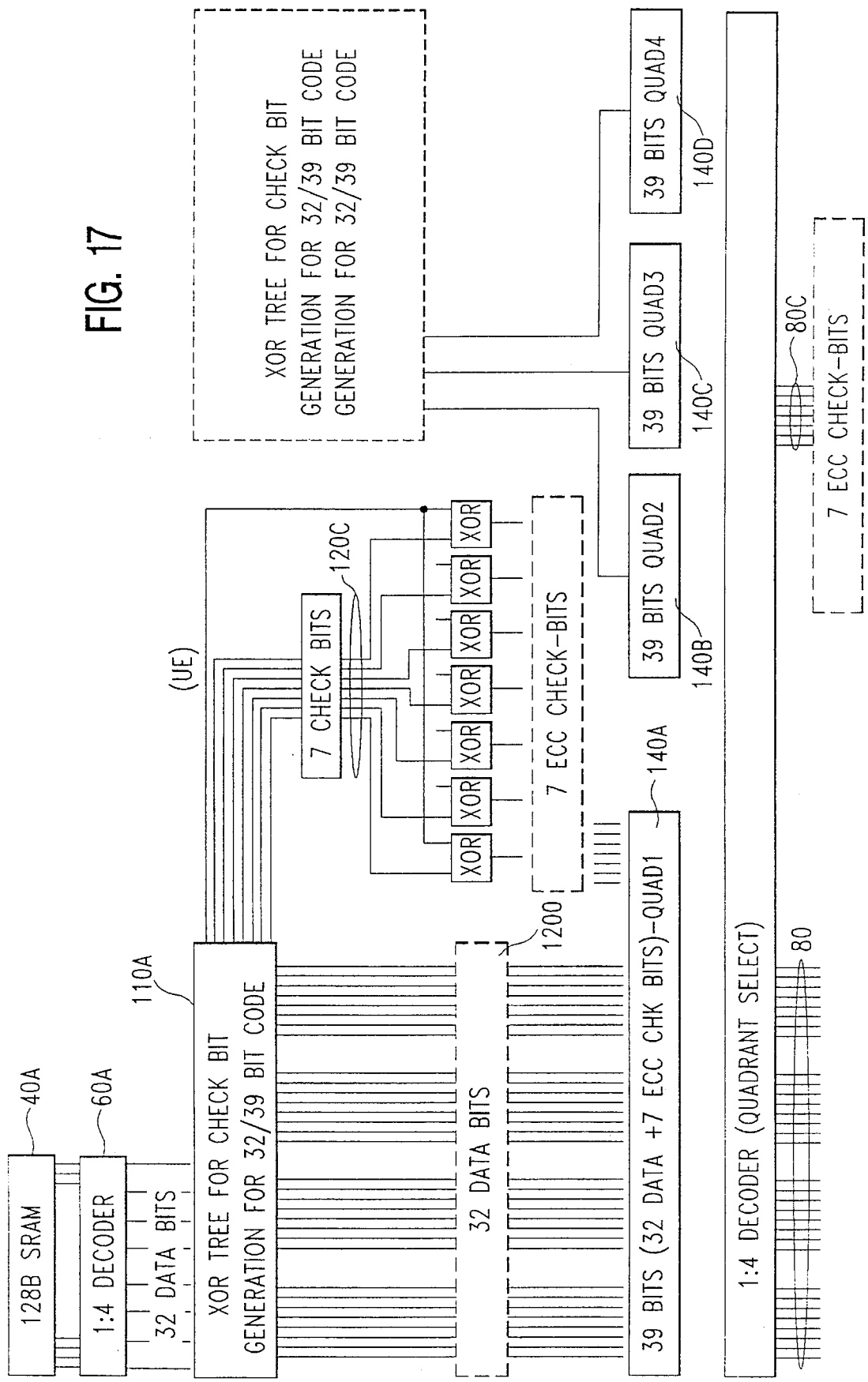
FIG. 17 is a block diagram of a fourth embodiment of the present invention.

FIG. 17 shows a fourth embodiment of the invention. Similarly to FIG. 16, an ECC tree that generates seven check bits based on 32 data bits is used. However, instead of having one of these trees for the chip, each quadrant has its own, wherein the outputs are multiplexed to the chip outputs by a decoder. Within a quadrant A, a 1:4 decoder 65A selects 32 of the 128 outputs from SRAM 40A. These 32 bits are the 32 data bits fed to the ECC tree 110A, which outputs data bits 120D and check bits 120C as discussed above. Note that the other quadrants B–D have similar circuitry. As a result, each quadrant produces its own group of 39 bits 140A–140D. A second 1:4 decoder then selects which of these four groups of 39 bits are to be passed to the outputs 80, 80C.

Accordingly, in the present invention the area/performance penalty presented by using error correction techniques is reduced by amortizing such penalties over more output bits. By increasing the number of output bits, access times can be decreased because less cell address cycles are needed. At the same time, this effect is enhanced by generating output bits instead of storing them. This makes the memory more area efficient, because less storage is required to output a given number of bits.

Various modifications can be made to the structures and teachings rendered above without departing from the spirit and scope of the present invention. For example, while Hamming codes have been used to correct the data originally fetched from memory, other techniques such as horizontal—vertical parity could be used. This also applies to the check bits generated for the second data word selected from the "clean" data. While the invention has been described as embodied on a single chip, it could also be practiced on a memory card or other substrate populated with conventional memory chips, wherein their respective outputs are multiplexed into a central error correction system that provides the "clean" data to the circuitry of the invention.

What is claimed is:

1. A memory system for providing binary information bits to a data processing unit, comprising:

first means for storing a plurality of data bits and first error checking bits;

second means for fetching selected ones of said plurality of data bits and said first error checking bits from said first means and correcting any data bits that are determined to be faulty and for storing the combination of said selected uncorrected and corrected data bits as corrected data;

third means for fetching some but not all of said selected ones of said plurality of corrected data bits from said second means and, without using said first error checking bits, generating second error checking bits therefor; and fourth means for outputting said some but not all of said selected ones of said plurality of corrected data bits along with said second error checking bits from said third means to the data processing unit.

2. The memory system of claim 1, wherein said second means comprises a Hamming code ECC system.

3. The memory system of claim 1, wherein said third means comprises a parity generator.

4. The memory system of claim 3, wherein said third means further comprises a decoder coupled between the output of said second means and the input to said parity generator.

5. The memory system of claim 1, wherein said third means comprises a plurality of parity generators, each receiving a different group of bits from said second means.

6. The memory system of claim 5, wherein said third means further comprises a decoder coupled between the outputs of all of said plurality of parity generators and said fourth means.

7. A system for outputting digital data, comprising:

first means for storing a plurality of data words, comprising data bits and first error checking bits in correspondence with each said word;

second means for fetching one of said plurality of data words from said first means, and for correcting any single failing bits within said fetched data word on the basis of said first error checking bits;

third means for fetching a subset of data bits from said fetched data word in said second means, and for generating at least one of second error correcting bits therefor; and fourth means for outputting said subset of data bits from said fetched data word in said second means and said at least one of second error correcting bits from said third means.

8. The system recited in claim 7, wherein said second means comprises a double error detect, single error correct Hamming code detection and correction block, and latch means for storing said fetched data word after correction.

9. The system recited in claim 7, wherein said third means comprises a parity generator, and a decoder coupled between said parity generator and said first means.

10. The system recited in claim 7, wherein said third means comprises a plurality of parity generators, each of which is coupled to receive the outputs of selected ones of said latch means, and a decoder coupled between the outputs of all of said plurality of parity generators and said fourth means.

11. The system recited in claim 7, wherein said first means comprises a plurality of memory arrays, said second means fetching a data word from each of said plurality of memory arrays.

12. The system recited in claim 11, wherein said third means selects bits from said data words from each of said plurality of memory arrays, said third means comprising a check bit generator.

13. The system recited in claim 12, wherein said third means generates a single set of check bits based on said selected bits from said data words from each of said plurality of memory arrays.

14. The system recited in claim 13, wherein said check bits are Hamming code check bits.

15. The system recited in claim 12, wherein said third means generates a set of check bits for said selected bits from each of said data words from each of said plurality of memory arrays.

16. The system recited in claim 15, wherein said third means further comprises a decoder for selecting one of said set of check bits as well as said selected bits from said data words from one of said plurality of memory arrays to be output by said fourth means.

17. A memory system, comprising:

a plurality of memory arrays;

first means for fetching a first data word and a first check bit word from at least one of said plurality of memory arrays, and for correcting any single bit within said first data word should it be faulty as a function of said first check bit word;

second means for latching said first data word as corrected by said first means;

third means for fetching a second data word from said first data word in said second means, said second data word having less bits than said first data word, said third means generating a second check bit word without using any of said first check bit word from said second data word; and fourth means for outputting said second data word and said second bit word.

18. The memory system of claim 17, wherein said said second data word has 8 bits.

19. The memory system of claim 18, wherein said second check bit word has 1 bit.

20. The memory system of claim 1, wherein said second data word has 32 bits.

21. The memory system of claim 20, wherein said second check bit word has 7 bits.

22. A data processor, comprising:

means for storing a first plurality of data bits that have been corrected to remove any single-bit errors; and means for fetching selected ones of said first plurality of data bits from said storage means and for generating a second plurality of error correcting bits therefrom, based on the assumed accuracy of said first plurality of data bits, the fetching means outputting both the selected ones of said first plurality of bits and said second plurality of error correcting bits.

23. A memory chip, comprising:

a plurality of memory cells;

first means for fetching data, comprising data bits and first error checking bits from a first set of said plurality of memory cells, and for correcting one of said data bits from one of said plurality of memory cells on the basis of said first error checking bits;

second means for fetching a subset of the data bits fetched and corrected by said first means, and for generating a plurality of second error checking bits comprising parity or check bits therefrom; and third means for outputting said subset of the data fetched and corrected by said first means and said parity or check bits.

24. The memory chip of claim 23, wherein said first means includes means for generating an uncorrectable error signal if data fetched from said first set of said plurality of memory cells cannot be corrected by said first means.

25. The memory chip of claim 24, wherein said second means receives said uncorrectable error signal from said first means, and invalidates said generated parity or check bits when said uncorrectable error signal indicates an uncorrectable condition.

26. The memory chip of claim 25, wherein said parity generated by said second means is inverted when said uncorrectable error signal indicates an uncorrectable condition.

27. The memory chip of claim 25, wherein at least one of said check bits generated by said second means is inverted when said uncorrectable error signal indicates an uncorrectable condition.

* * * * *